United States Patent [19]
Ohara et al.

[11] Patent Number: 6,136,915
[45] Date of Patent: Oct. 24, 2000

[54] AROMATIC POLYAMIDE RESIN COMPOSITIONS

[75] Inventors: Shinji Ohara; Hiroaki Chakihara; Satoru Nakamoto, all of Yamaguchi, Japan

[73] Assignee: UBE Industries, Ltd., Yamaguchi, Japan

[21] Appl. No.: 09/241,480

[22] Filed: Feb. 1, 1999

[30] Foreign Application Priority Data

Feb. 6, 1998 [JP] Japan .................................. 10-025682

[51] Int. Cl.⁷ .................................................. C08Z 77/00
[52] U.S. Cl. ............................................. 524/538; 525/432
[58] Field of Search ............................... 525/432; 524/538

[56] References Cited

U.S. PATENT DOCUMENTS

| | | | |
|---|---|---|---|
| 4,835,223 | 5/1989 | Maatman et al. | 525/432 |
| 5,071,924 | 12/1991 | Koch et al. | 525/432 |
| 5,206,310 | 4/1993 | Yasue et al. | 525/432 |
| 5,248,738 | 9/1993 | Sato et al. | 525/432 |
| 5,391,640 | 2/1995 | Akkapeddi et al. | 525/432 |

FOREIGN PATENT DOCUMENTS

| | | | |
|---|---|---|---|
| 57-42761 | 3/1982 | Japan | 525/432 |
| 57-115452 | 7/1982 | Japan | 525/432 |
| 61-188453 | 8/1986 | Japan . | |
| 62-218445 | 9/1987 | Japan . | |
| 1-249857 | 10/1989 | Japan . | |
| 3-72564 | 3/1991 | Japan . | |
| 3-201375 | 9/1991 | Japan . | |
| 4-239571 | 8/1992 | Japan . | |

OTHER PUBLICATIONS

Melvin I. Kohan (ed.), *Nylon Plastics Handbook*, Section 11.4, pp. 377–380 (Hasner Publishers 1995).

*Primary Examiner*—Ana Woodward
*Attorney, Agent, or Firm*—Akin, Gump, Strauss, Hauer & Feld, L.L.P.

[57] ABSTRACT

An aromatic polyamide resin composition excellent in flowability and suitability for short-cycle molding and having high heat resistance is disclosed, which is a partly aromatic polyamide resin composition comprising 50 to 95% by weight of (A) a crystalline partly aromatic copolyamide resin containing one kind of aromatic monomer units, and 5 to 50% by weight of at least one of (B) a crystalline partly aromatic copolyamide resin containing at least two kinds of aromatic monomer units and (C) a noncrystalline partly aromatic polyamide resin.

13 Claims, No Drawings

AROMATIC POLYAMIDE RESIN COMPOSITIONS

FIELD OF THE INVENTION

The present invention relates to polyamide resin compositions which not only have the excellent mechanical properties inherent in polyamide resins, but also are excellent in flowability during molding and suitability for short-cycle molding and have high heat resistance. These resin compositions are used as materials for automotive parts and electrical/electronic parts.

BACKGROUND OF THE INVENTION

Polyamide resins are used as engineering resins in various fields. In recent years, polyamide resins are increasingly required to have high heat resistance especially for use as automotive parts or electrical/electronic parts. For example, automotive parts, in particular, those to be disposed around the engine, are more and more required to have heat resistance with the increasing density of parts in the engine room as a result of the progress of functions in motor vehicles. With respect to electrical/electronic parts, the density of parts in electrical/electronic products is increasing with the miniaturization of the products, and the level of required heat resistance is rising accordingly. Furthermore, with the progress of SMT (surface mount technology), electrical/electronic parts are required to have high soldering heat resistance.

As one measure for satisfying these requirements, a technique of blending a crystalline aliphatic polyamide resin with an aromatic polyamide resin has been investigated (see, for example, JP-A-61-188453 and JP-A-62-218445 (the term "JP-A" as used herein means an "unexamined published Japanese patent application"). However, the resin composition obtained by this technique has insufficient heat resistance for use in SMT in which a high-temperature solder is used or for use as parts to be disposed around the engine and required to have a heat resistance higher than 150° C. Hence, the prior art composition has not been put to practical use.

Under these circumstances, a crystalline aromatic polyamide resin based on hexamethyleneterephthalamide has been put to practical use as a polyamide resin having high heat resistance, and is being used in various applications. Since the homopolymer of hexamethyleneterephthalamide has too high a melting point to be molded, the hexamethyleneterephthalamide-based polyamide resin generally used is one for which part of the terephthalic acid was replaced with an aliphatic dicarboxylic acid such as adipic acid (see, for example, JP-A-4-239571) or one in which ε-caprolactam or the like has been copolymerized (see, for example, JP-A-1-249857). Since these resins have high crystallinity, satisfactory suitability for short-cycle molding, and satisfactory in-mold flowability, they are extensively used as flame-retarded compositions in the field of electrical/electronic parts, mainly small parts. However, the resin obtained using an aliphatic dicarboxylic acid in combination with terephthalic acid has a lower glass transition temperature than the resin obtained using terephthalic acid as the only acid ingredient, and is hence unsuitable for use in applications where high rigidity is required at high temperatures.

Disclosed as a means for eliminating the above drawback is a copolyamide resin composition obtained by replacing part of the terephthalic acid with isophthalic acid. This composition has come to be increasingly used as a material having a high glass transition temperature in fields where high heat resistance is required (see, for example, JP-A-3-072564 and JP-A-3-201375). However, this composition containing isophthalic acid units has problems that its crystallinity decreases with the increasing proportion of isophthalic acid units and that the composition has a low solidification rate during molding and is inferior in in-mold flowability and suitability for short-cycle molding, although it can retain a high glass transition temperature. Namely, the above prior art composition not only has a problem of reduced productivity but has quality problems such as susceptibility to in-mold burning.

SUMMARY OF THE INVENTION

An object of the present invention is to provide a polyamide resin composition excellent in flowability and suitability for short-cycle molding and having high heat resistance, in order to eliminate the problems described above.

The present inventors made intensive investigations in order to eliminate those problems. As a result, they have found that the object can be accomplished by blending the conventional, crystalline, partly aromatic polyamide resin with a high-melting, crystalline, partly aromatic polyamide resin and/or a noncrystalline partly aromatic polyamide resin. The present invention has been achieved based on this finding.

The present invention provides a partly aromatic polyamide resin composition comprising:

50 to 95% by weight of (A) a crystalline partly aromatic copolyamide resin containing one kind of aromatic monomer units; and 5 to 50% by weight of at least one of (B) a crystalline partly aromatic copolyamide resin containing at least two kinds of aromatic monomer units and (C) a noncrystalline partly aromatic polyamide resin.

DETAILED DESCRIPTION OF THE INVENTION

The crystalline partly aromatic copolyamide resin containing one kind of aromatic monomer units (A) for use in the present invention is a copolyamide containing one kind of aromatic monomer units such as units derived from an aromatic dicarboxylic acid, e.g., terephthalic acid, isophthalic acid, or naphthalenedicarboxylic acid, or units derived from an aromatic diamine, e.g., m-xylenediamine. The resin (A) is preferably a crystalline partly aromatic copolyamide resin containing one kind of aromatic monomer units and having a melting point of 260° C. or higher but below 320° C., and is more preferably a crystalline partly aromatic copolyamide resin containing one kind of aromatic monomer units and having a melting point of 290° C. or higher but below 316° C.

The crystalline partly aromatic copolyamide resin containing one kind of aromatic monomer units (A) is preferably a crystalline copolyamide formed from a monomer combination consisting of an equimolar salt of an aliphatic diamine with an aliphatic dicarboxylic acid, an equimolar salt of an aliphatic diamine with an aromatic dicarboxylic acid, and/or at least one monomer forming an aliphatic polyamide.

Examples of the aliphatic diamine include those having 4 to 12 carbon atoms, such as tetramethylenediamine, hexamethylenediamine, octamethylenediamine, nonamethylenediamine, undecamethylenediamine, and dodecamethylenediamine.

Examples of the aliphatic dicarboxylic acid include those having 6 to 12 carbon atoms, such as adipic acid, heptanedicarboxylic acid, octanedicarboxylic acid, nonanedicarboxylic acid, undecanedicarboxylic acid, and dodecanedicarboxylic acid.

A preferred combination is an equimolar salt of hexamethylenediamine with adipic acid.

Examples of the aromatic dicarboxylic acid include terephthalic acid, isophthalic acid, and naphthalenedicarboxylic acid. A preferred combination is an equimolar salt of hexamethylenediamine with terephthalic acid.

Examples of the monomer forming an aliphatic polyamide include aminocarboxylic acids having 6 to 12 carbon atoms and lactams having 6 to 12 carbon atoms. Specific examples thereof include 6-aminocaproic acid, 7-aminoheptanoic acid, 11-aminoundecanoic acid, 12-aminododecanoic acid, α-pyrrolidone, ε-caprolactam, laurolactam, and ε-enantholactam. Preferred of these are 6-aminocaproic acid, 11-aminoundecanoic acid, 12-aminododecanoic acid, ε-caprolactam, and laurolactam. Such monomers each forming an aliphatic polyamide can be used either alone or as a mixture of two or more thereof.

These compounds are used in such a proportion that the amount of the equimolar salt of hexamethylenediamine with adipic acid, that of the equimolar salt of hexamethylenediamine with terephthalic acid, and that of the monomer forming an aliphatic polyamide are generally from 30 to 70% by weight, from 70 to 30% by weight, and from 0 to 15% by weight, respectively, preferably from 35 to 55% by weight, from 65 to 45% by weight, and from 0 to 10% by weight, respectively, and more preferably from 35 to 55% by weight, from 65 to 45% by weight, and from 1 to 10% by weight, respectively.

The crystalline partly aromatic copolyamide resin containing at least two kinds of aromatic monomer units (B) for use in the present invention may be a copolyamide resin containing at least two kinds of aromatic monomer units such as units derived from at least two of dicarboxylic acids having one or more aromatic rings, e.g., terephthalic acid, isophthalic acid, and naphthalenedicarboxylic acid, and aromatic diamines, e.g., m-xylenediamine. The resin (B) is preferably a crystalline partly aromatic copolyamide resin containing at least two kinds of aromatic monomer units and having a melting point of 300° C. or higher, and is more preferably a crystalline partly aromatic copolyamide resin containing at least two kinds of aromatic monomer units and having a melting point of 316° C. or higher.

The crystalline partly aromatic copolyamide resin containing at least two kinds of aromatic monomer units (B) is preferably a crystalline partly aromatic copolyamide formed from a monomer combination consisting of two or more equimolar salts of an aliphatic diamine with an aromatic dicarboxylic acid, and/or at least one monomer forming an aliphatic polyamide.

Examples of the aliphatic diamine include those having 4 to 12 carbon atoms, such as tetramethylenediamine, hexamethylenediamine, octamethylenediamine, nonamethylenediamine, undecamethylenediamine, and dodecamethylenediamine.

Examples of the aromatic dicarboxylic acid include terephthalic acid, isophthalic acid, and naphthalenedicarboxylic acid. Preferred combinations are an equimolar salt of hexamethylenediamine with terephthalic acid and an equimolar salt of hexamethylenediamine with isophthalic acid.

Examples of the monomer forming an aliphatic polyamide include aminocarboxylic acids having 6 to 12 carbon atoms and lactams having 6 to 12 carbon atoms. Specific examples thereof include 6-aminocaproic acid, 7-aminoheptanoic acid, 11-aminoundecanoic acid, 12-aminododecanoic acid, α-pyrrolidone, ε-caprolactam, laurolactam, and ε-enantholactam. Preferred of these are 6-aminocaproic acid, 11-aminoundecanoic acid, 12-aminododecanoic acid, ε-caprolactam, and laurolactam. Such monomers each forming an aliphatic polyamide can be used either alone or as a mixture of two or more thereof.

These compounds are used in such a proportion that the amount of the equimolar salt of hexamethylenediamine with terephthalic acid, that of the equimolar salt of hexamethylenediamine with isophthalic acid, and that of the monomer forming an aliphatic polyamide are generally from 90 to 50% by weight, from 10 to 50% by weight, and from 0 to 15% by weight, respectively, preferably from 80 to 60% by weight, from 20 to 40% by weight, and from 0 to 10% by weight, respectively, and more preferably from 80 to 60% by weight, from 20 to 40% by weight, and from 1 to 10% by weight, respectively.

The noncrystalline partly aromatic polyamide resin (C) for use in the present invention is a polyamide resin containing at least one kind of units derived from terephthalic acid or a heteroaromatic compound besides units derived from isophthalic acid. This noncrystalline partly aromatic polyamide resin heightens only the glass transition temperature of the composition without elevating the melt processing temperature of the whole composition to thereby function to improve high-temperature rigidity and creep characteristics. This noncrystalline partly aromatic polyamide resin is preferably a noncrystalline polyamide whose glass transition temperature determined from the loss modulus peak temperature obtained in the absolute dry state through a dynamic viscoelasticity measurement is 100° C. or higher, and which desirably contains units derived from two or more equimolar salts of an aliphatic diamine with an aromatic dicarboxylic acid.

Examples of the aliphatic diamine include those having 4 to 12 carbon atoms, such as tetramethylenediamine, hexamethylenediamine, octamethylenediamine, nonamethylenediamine, undecamethylenediamine, and dodecamethylenediamine.

Examples of the aromatic dicarboxylic acid include terephthalic acid, isophthalic acid, and naphthalenedicarboxylic acid. Preferred combinations are an equimolar salt of hexamethylenediamine with terephthalic acid and an equimolar salt of hexamethylenediamine with isophthalic acid.

These compounds are used in such a proportion that the amount of the equimolar salt of hexamethylenediamine with isophthalic acid and that of the equimolar salt of hexamethylenediamine with terephthalic acid are generally from 90 to 60% by weight and from 10 to 40% by weight, respectively, and preferably from 80 to 65% by weight and from 20 to 35% by weight, respectively.

In the present invention, the mixing ratio of the crystalline partly aromatic copolyamide resin containing one kind of aromatic monomer units (A) to the crystalline partly aromatic copolyamide resin containing at least two kinds of aromatic monomer units (B) and/or the noncrystalline partly aromatic polyamide resin (C) is such that the proportion of the resin (A) and that of the resin (B) and/or resin (C) are generally from 95 to 50% by weight and from 5 to 50% by weight, respectively, preferably from 90 to 60% by weight and from 10 to 40% by weight, respectively, and more preferably from 85 to 70% by weight and from 15 to 30% by weight, respectively.

If the use amount of the crystalline partly aromatic copolyamide resin containing at least two kinds of aromatic monomer units (B) is larger than the upper limit specified above, molding should be conducted at a temperature higher than 330° C. in order to obtain sufficient flowability during molding, so that the molding machines which can be used are limited. In addition, such too large use amounts thereof are undesirable in that they lead to burning or deterioration during molding, resulting in impaired properties.

If the use amount of the noncrystalline partly aromatic polyamide resin (C) is larger than the upper limit specified above, crystallization becomes slow and suitability for short-cycle molding is hence impaired. In addition, such too large amounts thereof are undesirable in that in-mold flowability is impaired especially in the production of small molded articles.

Furthermore, if the total use amount of the crystalline partly aromatic copolyamide resin containing at least two kinds of aromatic monomer units (B) and/or the noncrystalline partly aromatic polyamide resin (C) is smaller than 5% by weight, the effect of heightening the glass transition temperature is lessened and, hence, the object of the present invention cannot be accomplished.

The resin composition of the present invention as it is can be used as a material for automotive or electrical/electronic parts. However, by mixing 100 parts by weight of the obtained resin composition with up to 200 parts by weight of one or more fillers and additives, a resin composition usable for a wider variety of molded articles can be provided.

Examples of the fillers for use in the composition include fibrous inorganic materials such as glass fibers, carbon fibers, wollastonite, and potassium titanate whiskers, inorganic fillers such as montmorillonite, talc, mica, calcium carbonate, silica, clay, glass powder, and glass beads, and organic fillers such as various organic or polymeric powders.

Examples of the additives include a heat resistance improver, weathering agent, nucleating agent, crystallization accelerator, release agent, antistatic agent, flame retardant, flame retardant aid, e.g., antimony trioxide, and function-imparting agent, e.g., a coloring pigment.

More specifically, examples of the heat resistance improver include hindered phenols, phosphites, thioethers, and copper halides. Such heat resistance improvers may be used alone or in combination.

Examples of the weathering agent include hindered amines and salicylates. Such weathering agents may be used alone or in combination.

Examples of the nucleating agent include inorganic fillers such as talc and clay and organic nucleating agents such as metal salts of fatty acids. Such nucleating agents may be used alone or in combination.

Examples of the crystallization accelerator include low-molecular polyamides, higher fatty acids, higher fatty acid esters, and higher aliphatic alcohols. Such crystallization accelerators may be used alone or in combination.

Examples of the release agent include metal salts of fatty acids, fatty acid amides, and various waxes. Such release agents may be used alone or in combination.

Examples of the antistatic agent include aliphatic alcohols, esters of aliphatic alcohols, and esters of higher fatty acids. Such antistatic agents may be used alone or in combination.

Examples of the flame retardant include metal hydroxides such as magnesium hydroxide, phosphorus, ammonium phosphate, ammonium polyphosphates, melamine cyanurate, ethylenedimelamine dicyanurate, potassium nitrate, brominated epoxy compounds, brominated polycarbonate compounds, brominated polystyrene compounds, poly(tetrabromobenzyl acrylate), tribromophenol polycondensates, polybromobiphenyl ethers, and chlorine compound flame retardants. Such flame retardants may be used alone or in combination.

One or more other thermoplastic resin compositions can be added to the resin composition of the present invention as long as the addition thereof does not defeat the object of the invention. Examples of the optionally usable thermoplastic resins include general-purpose resins such as polyethylene, polypropylene, polystyrene, ABS resins, AS resins, and acrylic resins, aliphatic polyamide resins such as nylon-6, nylon-66, and nylon-12, polycarbonates, poly(phenylene oxide), poly(ethylene terephthalate), poly(butylene terephthalate), poly(phenylene sulfide), and other highly heat-resistant resins. Especially in the case of using polyethylene or polypropylene as an optional resin, this polymer is desirably one which has been modified with maleic anhydride, a glycidyl-containing monomer, etc.

The resin composition of the present invention may be used in such a manner that the individual resins each in a pellet form are blended and melt-mixed in the stage where final products are obtained. Alternatively, the individual resins are melt-mixed before being subjected to molding.

The present invention will be explained below in more detail by reference to the following Examples and Comparative Examples. However, the invention should not be construed as being limited to these Examples.

In the Examples and Comparative Examples, properties of molded articles were determined in the following manners. (Property Evaluation)
(1) Relative viscosity:
In accordance with JIS K6810, measurement was made at 25° C. using 98% concentrated sulfuric acid.
(Evaluation of Mechanical Properties)
Molded test pieces were evaluated with respect to the following items. Each evaluation was made on dry-state samples.
(2) Tensile strength and elongation:
In accordance with ASTM D638, No. 4 test pieces having a thickness of 1 mm were examined at a pulling rate of 50 mm/min.
(3) Flexural strength and flexural modulus:
In accordance with ASTM D790, the three-point bending test was conducted using strip test pieces having a thickness of 3.2 mm.
(4) Glass transition temperature:
Strip test pieces having a thickness of 1.6 mm were examined for dynamic viscoelasticity, and the glass transition temperature of each test piece was determined from the found peak temperature for loss modulus.
(Evaluation of Moldability)
(5) Moldability and releasability:
A ribbed, small and long, box mold having dimensions of 10 mm by 10 mm by 50 mm and a wall thickness of 1 mm and having an inner wall about 0.9 mm thick at an interval of about 10 mm was used to mold each composition under the conditions of a cooling time of 10 seconds using a molding machine regulated so as to have a cylinder temperature higher by 20° C. than the melting point of the composition. Each composition was thus evaluated for releasability and molded-article deformation. However, in order to avoid thermal decomposition of resins, the maximum cylinder temperature was set at 330° C., and all the compositions each containing at least one polyamide resin having a melting point of 310° C. or higher were molded at 330° C. High-melting compositions, for which a higher packing pressure is necessary, have poor moldability.

(6) Suitability for short-cycle molding:

Each composition was analyzed by DSC (differential scanning calorimetry) in which heating and cooling were conducted at a rate of 20° C./min, and the difference between two peak temperatures respectively attributable to melting and solidification (Tm—Tc) was determined. This temperature difference was used as a measure of suitability for short-cycle molding. The smaller the temperature difference, the faster the solidification and the higher the suitability for short-cycle molding.

The crystalline partly aromatic polyamide resins and noncrystalline partly aromatic polyamide resins used in the Examples according to the present invention and in Comparative Examples were obtained through polymerization according to the Reference Examples given below.

REFERENCE EXAMPLE 1

3.46 kg of terephthalic acid was mixed with 2.46 kg of hexamethylenediamine and 11.94 kg of deaerated water (concentration of the resultant mixture: 33 wt %) to prepare a homogeneous solution having an acidity (pH) of 7.8 at 80° C. (aqueous 6T salt solution). This aqueous 6T salt solution was introduced into a 70-liter polymerizer. Thereto were added 190 g of stearic acid and 19 g of sodium hypophosphite. The contents were heated to 180° C. while keeping the pressure at 690 kPa to thereby concentrate the reaction mixture to 60%. Thereafter, 11.08 kg of a 50% aqueous solution of an equimolar salt of adipic acid with hexamethylenediamine which solution had been prepared beforehand was introduced into the polymerizer, and the resultant mixture was homogenized. Subsequently, the pressure and temperature inside the polymerizer were elevated to 2.16 MPa and 240° C., respectively, and the reaction mixture was held in this state for 2 hours. After the 2 hours, the resin resulting from polymerization was withdrawn through a nozzle to obtain a low-molecular weight polymer having a relative viscosity of 1.2. This polymer was pulverized and was then melt-kneaded and polymerized with heating at 330° C. using a twin-screw extruder having a screw diameter of 44 mm (L/D=30). Thus, a polymer having a relative viscosity of 2.4 and a melting point of 300° C. was obtained (A-1; Crystalline 66/6T).

REFERENCE EXAMPLE 2

9.30 kg of terephthalic acid was mixed with 3.99 kg of isophthalic acid, 12.04 kg of hexamethylenediamine, and 25.30 kg of deaerated water (concentration of the resultant mixture: 40 wt %). Thereto was added 183 g of benzoic acid to prepare a homogeneous solution having an acidity (pH) of 8.05 at 80° C. (aqueous 6T/6I salt solution). This aqueous 6T/6I salt solution was introduced into a 70-liter polymerizer. Thereto was added 21 g of sodium hypophosphite. The pressure and temperature inside the polymerizer were evaluated to 3.43 MPa and 260° C., respectively, and the reaction mixture was held in this state for 2 hours. After the 2 hours, the resin resulting from polymerization was withdrawn through a nozzle to obtain a low-molecular weight polymer having a relative viscosity of 1.14. This polymer was pulverized and was then melt-kneaded and polymerized with heating at 330° C. using a twin-screw extruder having a screw diameter of 44 mm (L/D=30). Thus, a polymer having a relative viscosity of 2.2 and a melting point of 325° C. was obtained. (B-1; Crystalline 6T/6I).

REFERENCE EXAMPLE 3

3.0 kg of terephthalic acid was mixed with 2.1 kg of hexamethylenediamine and 11.9 kg of deaerated water (concentration of the resultant mixture: 30 w %). This mixture was heated to 70° C. to prepare a homogeneous solution having a pH of 7.1 (aqueous 6T salt solution). On the other hand, 7.0 kg of isophthalic acid was mixed with 4.9 kg of hexamethylenediamine and 7.9 kg of deaerated water (concentration of the resultant mixture: 60 wt %). This mixture was heated to 60° C. to prepare a homogeneous solution having a pH of 7.5 (aqueous 6I salt solution). The aqueous 6T salt solution and aqueous 6I salt solution were introduced into a 70-liter polymerizer. Thereto were added 285 g of stearic acid and 21 g of sodium hypophosphite. The resultant mixture was homogenized. This mixture was heated to 230° C., subsequently held at a pressure of 3 MPa for 3 hours, and then heated to 270° C. while gradually lowering the pressure. After the internal pressure reached ordinary pressure, the contents were held at 270° C. for 2 hours in a nitrogen stream and the resultant resin was then withdrawn as a transparent strand. Thus, a polymer having a relative viscosity of 2.4 and a glass transition temperature of 122° C. was obtained (C-1; Non-crystalline 6T/6I).

The other partly aromatic polyamide resins used in the Examples according to the present invention and in the Comparative Examples were obtained according to Reference Examples 1 to 3. These resins are summarized in Table 1.

TABLE 1

| Resin | A-1 | A-2 | A-3 | A-4 | B-1 | B-2 | C-1 | C-2 |
|---|---|---|---|---|---|---|---|---|
| Kind | 66/6T | | 66/6T/12 | | 6T/6I | 6T/6I/12 | 6T/6I | |
| Proportion | | | | | | | | |
| 66 | 50 | 40 | 48.5 | 38.8 | | | | |
| 6T | 50 | 60 | 48.5 | 58.2 | 70 | 66.5 | 30 | 40 |
| 6I | | | | | 30 | 28.5 | 70 | 60 |
| 12 | | | 3.0 | 3.0 | | 3.0 | | |
| Melting point (° C.) | 300 | 315 | 295 | 310 | 325 | 320 | — | — |
| $T_g$ (° C.) | 80 | 100 | 80 | 100 | 130 | 120 | 122 | 125 |
| $\eta_r$ | 2.4 | 2.4 | 2.4 | 2.4 | 2.2 | 2.2 | 2.4 | 2.4 |
| Crystallinity | crystalline | | crystalline | | crystalline | | non-crystalline | |

The values of melting point and $T_g$ (glass transition temperature) were obtained using dry test pieces through dynamic viscoelasticity measurement.

$\eta_r$ (relative viscosity) was measured at 25° C. using a solution prepared by dissolving 1 g of a dry sample in 100 ml of 98% concentrated sulfuric acid.

The values of proportion are given in terms of wt %.

EXAMPLE 1

To a 70/30 by weight mixture of the crystalline partly aromatic polyamide resin having a melting point of 300° C. (A-1; Crystalline 66/6T) and the crystalline partly aromatic polyamide resin having a melting point of 325° C. (B-1; Crystalline 6T/6I) were added Irganox 1010 and Irgafos 168 (both manufactured by Ciba-Geigy Ltd.) as heat stabilizers each in an amount of 2,000 ppm and calcium stearate as a release agent in an amount of 1,000 ppm. These ingredients were mixed together beforehand. The resultant mixture was melt-kneaded with a vented twin-screw extruder having a screw diameter of 44 mm and an L/D of 30 at a temperature of 320° C. and a processing rate of 80 kg/hr. The composition obtained was placed in a rotary dryer. After the atmosphere in the dryer was replaced with nitrogen, the composition was vacuum-dried at 80° C. Using an injection molding machine, the dried composition was formed into test pieces for various evaluations. These test pieces were evaluated for various mechanical properties. The dried material was further evaluated for moldability.

The results of these evaluations are shown in Table 2.

EXAMPLES 2 TO 12 AND COMPARATIVE EXAMPLES 1 TO 5

Resin compositions were obtained in the same manner as in Example 1, except that the kinds and proportions of the resins (A), (B), and (C) were changed as shown in Tables 2 and 3. The compositions obtained were similarly evaluated for mechanical properties and moldability. The results obtained are also shown in Tables 2 and 3.

TABLE 2

| Example/Comparative Example | Ex. 1 | Ex. 2 | Ex. 3 | Ex. 4 | Ex. 5 | Ex. 6 | Ex. 7 |
|---|---|---|---|---|---|---|---|
| Resin (A) | | | | | | | |
| Kind | A-1 | A-2 | A-3 | A-4 | A-4 | A-4 | A-4 |
| Proportion (wt %) | 70 | 70 | 70 | 70 | 70 | 70 | 70 |
| Resin (B) and/or (C) | | | | | | | |
| Kind | B-1 | B-1 | B-1 | B-1 | B-2 | C-1 | C-2 |
| Proportion (wt %) | 30 | 30 | 30 | 30 | 30 | 30 | 30 |
| Moldability | good | good | good | good | good | good | good |
| Releasability | good | good | good | good | good | good | good |
| $T_m - T_c$ (° C.) | 41 | 40 | 42 | 42 | 43 | 45 | 45 |
| $T_g$ (° C.) | 102 | 109 | 100 | 108 | 108 | 108 | 108 |
| Tensile strength (MPa) | 63 | 63 | 62 | 68 | 66 | 61 | 60 |
| Flexural modulus (GPa) | 2.05 | 2.10 | 2.05 | 2.35 | 2.34 | 2.00 | 2.00 |
| (Wet state) (GPa) | 2.15 | 2.20 | 2.10 | 2.33 | 2.30 | 2.30 | 2.20 |

TABLE 3

| Example/Comparative Example | Ex. 8 | Ex. 9 | Ex. 10 | Ex. 11 | Ex. 12 | Comp. Ex. 1 | Comp. Ex. 2 | Comp. Ex. 3 | Comp. Ex. 4 | Comp. Ex. 5 |
|---|---|---|---|---|---|---|---|---|---|---|
| Resin (A) | | | | | | | | | | |
| Kind | A-4 | A-4 | A-4 | A-4 | A-4 | — | — | A-4 | A-4 | A-4 |
| Proportion (wt %) | 60 | 60 | 60 | 90 | 90 | | | 40 | 40 | 97 |
| Resin (B) and/or (C) | | | | | | | | | | |
| Kind | B-1 | C-1 | B-1/C-1 | B-1 | C-1 | B-1 | B-2 | B-1 | C-1 | B-1 |
| Proportion (wt %) | 40 | 40 | 20/20 | 10 | 10 | 100 | 100 | 60 | 60 | 3 |
| Moldability | good | good | good | good | good | poor | poor | poor | poor | good |
| Releasability | good | good | good | good | good | good | good | good | poor | good |
| $T_m-T_c$ (° C.) | 38 | 45 | 41 | 38 | 40 | 43 | 43 | 42 | 60 | 43 |
| $T_g$ (° C.) | 110 | 108 | 109 | 105 | 102 | 130 | 120 | 115 | 110 | 93 |
| Tensile strength (MPa) | 67 | 60 | 68 | 65 | 65 | 63 | 65 | 65 | 58 | 60 |
| Flexural modulus (GPa) | 2.40 | 2.00 | 2.28 | 2.29 | 2.25 | 2.24 | 2.20 | 2.25 | 1.90 | 2.00 |
| (Wet state) (GPa) | 2.35 | 2.28 | 2.43 | 2.35 | 2.30 | 2.41 | 2.35 | 2.40 | 2.10 | 1.98 |

The above results show that increasing the proportion of a resin (B) raised difficulties in mold filling and hence resulted in impaired moldability. Increasing the proportion of a resin (C), which was noncrystalline, retarded in-mold solidification and hence resulted in impaired moldability and releasability. Furthermore, when the addition amount of a resin (B) and/or a resin (C) was too small, the composition had too low a glass transition temperature and poor heat resistance.

The partly aromatic polyamide resin compositions of the present invention not only have the mechanical properties inherent in crystalline polyamide resins, but also combine high heat resistance and excellent moldability. Due to these properties, the resin compositions can be used in short-cycle molding or in producing large molded articles, without the necessity of using a special molding machine or a special molding method, to provide molded articles capable of withstanding long-term use in a high-temperature environment as in the engine room of a motor vehicle or in a high-humidity environment.

While the invention has been described in detail and with reference to specific embodiments thereof, it will be apparent to one skilled in the art that various changes and modifications can be made therein without departing from the spirit and scope thereof.

What is claimed is:

1. A partly aromatic polyamide resin composition comprising:

50 to 95% by weight of (A) a crystalline partly aromatic copolyamide resin containing only one kind of aromatic monomer units and produced from:

30 to 70% by weight of (i) an equimolar salt of hexamethylenediamine with adipic acid, 30 to 70% by weight of (ii) an equimolar salt of hexamethylenediamine with terephthalic acid, and 0 to 15% by weight of (iii) at least one monomer forming an aliphatic polyamide, wherein the percentages by weight of components (i), (ii) and (iii) are based on a total weight of (i), (ii) and (iii); and 5 to 50% by weight of at least one selected from the group consisting of (B) a crystalline partly aromatic copolyamide resin containing at least two kinds of aromatic monomer units and (C) a noncrystalline partly aromatic polyamide resin, wherein all of the percentages by weight of components (A), (B) and (C) are based on a total weight of (A), (B) and (C).

2. The partly aromatic aromatic polyamide resin composition as claimed in claim 1, wherein component (A) has a melting point of 260° C. or higher but below 320° C. and component (B) has a melting point of 300° C. or higher.

3. The partly aromatic polyamide resin composition as claimed in claim 2, wherein component (B) is a crystalline partly aromatic copolyamide produced from:

50 to 90% by weight of (iv) an equimolar salt of hexamethylenediamine with terephthalic acid, 10 to 50% by weight of (v) an equimolar salt of hexamethylenediamine with isophthalic acid, and 0 to 15% by weight of (vi) at least one monomer forming an aliphatic polyamide, wherein the percentages by weight of components (iv), (v) and (vi) are based on a total weight of (iv), (v) and (vi);

and component (C) is a noncrystalline partly aromatic copolyamide produced from:

60 to 90% by weight of (vii) an equimolar salt of hexamethylenediamine with isophthalic acid, and 10 to 40% by weight of (viii) an equimolar salt of hexamethylenediamine with terephthalic acid, wherein the percentages by weight of components (vii) and (viii) are based on a total weight of (vii) and (viii).

4. The partly aromatic polyamide resin composition as claimed in claim 3, wherein the monomer forming an aliphatic polyamide is at least one member selected from the group consisting of aminocaproic acids, ε-caprolactam, aminoundecanoic acids, aminododecanoic acids, and laurolactam.

5. The partly aromatic polyamide resin composition as claimed in claim 2, wherein the monomer forming an aliphatic polyamide is at least one member selected from the group consisting of aminocaproic acids, ε-caprolactam, aminoundecanoic acids, aminododecanoic acids, and laurolactam.

6. The partly aromatic polyamide resin composition as claimed in claim 1, wherein component (B) is a crystalline partly aromatic copolyamide produced from:

50 to 90% by weight of (iv) an equimolar salt of hexamethylenediamine with terephthalic acid, 10 to 50% by weight of (v) an equimolar salt of hexamethylenediamine with isophthalic acid, and 0 to 15% by weight of (vi) at least one monomer forming an aliphatic polyamide, wherein the percentages by weight of components (iv), (v) and (vi) are based on a total weight of (iv), (v) and (vi);

and component (C) is a noncrystalline partly aromatic copolyamide produced from:

60 to 90% by weight of (vii) an equimolar salt of hexamethylenediamine with isophthalic acid, and 10 to 40% by weight of (viii) an equimolar salt of hexamethylenediamine with terephthalic acid, wherein the percentages by weight of components (vii) and (viii) are based on a total weight of (vii) and (viii).

7. The partly aromatic polyamide resin composition as claimed in claim 6, wherein the monomer forming an aliphatic polyamide is at least one member selected from the group consisting of aminocaproic acids, ε-caprolactam, aminoundecanoic acids, aminododecanoic acids, and laurolactam.

8. The partly aromatic polyamide resin composition as claimed in claim 1, wherein the monomer forming an aliphatic polyamide is at least one member selected from the group consisting of aminocaproic acids, ε-caprolactam, aminoundecanoic acids, aminododecanoic acids, and laurolactam.

9. A partly aromatic resin composition comprising:

50 to 95% by weight of (A) a crystalline partly aromatic copolyamide resin containing only one kind of aromatic monomer units; and 5 to 50% by weight of at least one selected from the group consisting of (B) a crystalline partly aromatic copolyamide containing at least two kinds of aromatic monomer units and (C) a noncrystalline partly aromatic polyamide resin, wherein the percentages by weight of any of (A), (B) and (C) are based on the total weight of (A), (B) and (C) and wherein component (B) is produced from 50 to 90% by weight of (i) an equimolar salt of hexamethylenediamine with terephthalic acid, 10 to 50% by weight of (ii) an equimolar salt of hexamethylenediamine with isophthalic acid, and 0 to 15% by weight of (iii) at least one monomer forming an aliphatic polyamide, wherein the percentages by weight of components (i), (ii) and (iii) are based on a total weight of (i), (ii) and (iii);

and component (C) is produced from:

60 to 90% by weight of (iv) an equimolar salt of hexamethylenediamine with isophthalic acid and 10 to 40% by weight of (v) an equimolar salt of hexamethylenediamine with terephthalic acid, wherein the percentages by weight of components (iv) and (v) are based on a total weight of (iv) and (v).

10. The partly aromatic polyamide resin composition as claimed in claim 9, wherein component (A) has a melting point of 260° C. or higher but below 320° C. and component (B) has a melting point of 300° C. or higher.

11. The partly aromatic polyamide resin composition as claimed in claim 10, wherein the monomer forming an aliphatic polyamide is at least one member selected from the group consisting of aminocaproic acids, ε-caprolactam, aminoundecanoic acids, aminododecanoic acids, and laurolactam.

12. The partly aromatic polyamide resin composition as claimed in claim 9, wherein the monomer forming an aliphatic polyamide is at least one member selected from the group consisting of aminocaproic acids, ε-caprolactam, aminoundecanoic acids, aminododecanoic acids, and laurolactam.

13. A partly aromatic polyamide resin composition which comprises:

100 parts by weight of the partly aromatic polyamide resin composition defined in claim 1, and up to 200 parts by weight of at least one of a filler or an additive.

* * * * *